United States Patent
Vertriest et al.

(10) Patent No.: US 11,247,166 B2
(45) Date of Patent: *Feb. 15, 2022

(54) COMPRESSOR INSTALLATION WITH DRYING DEVICE FOR COMPRESSED GAS AND METHOD FOR DRYING COMPRESSED GAS

(71) Applicant: ATLAS COPCO AIRPOWER, NAAMLOZE VENNOOTSCHAP, Wilrijk (BE)

(72) Inventors: Danny Etienne Andree Vertriest, Wilrijk (BE); Geert Hellemans, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 0 days.

This patent is subject to a terminal disclaimer.

(21) Appl. No.: 16/778,012

(22) Filed: Jan. 31, 2020

(65) Prior Publication Data

US 2020/0164301 A1    May 28, 2020

Related U.S. Application Data

(63) Continuation of application No. 15/784,890, filed on Oct. 16, 2017, now Pat. No. 10,576,411.

(30) Foreign Application Priority Data

Oct. 25, 2016    (BE) .................................. 2016/5804

(51) Int. Cl.
*B01D 53/06* (2006.01)
*B01D 53/26* (2006.01)
(Continued)

(52) U.S. Cl.
CPC ........... *B01D 53/06* (2013.01); *B01D 53/261* (2013.01); *F04B 39/06* (2013.01); *F04B 39/16* (2013.01);
(Continued)

(58) Field of Classification Search
CPC ...... B01D 53/04; B01D 53/06; B01D 53/261; B01D 53/265; B01D 2253/104;
(Continued)

(56) References Cited

U.S. PATENT DOCUMENTS 3,708,956 A    1/1973 Norback
4,249,915 A *  2/1981 Sircar ................. B01D 53/047
                                                    95/99

(Continued)

FOREIGN PATENT DOCUMENTS

EP    0799635 A1    10/1997
GB    1349733 A     4/1974

(Continued)

OTHER PUBLICATIONS

Partial European Search Report in related European Patent Application No. 17194439.0, dated Jun. 7, 2018.

*Primary Examiner* — Frank M Lawrence, Jr.
(74) *Attorney, Agent, or Firm* — Bacon & Thomas, PLLC

(57) ABSTRACT

A compressor installation with drying device for compressed gas, with the drying device containing a housing with a drying zone and a regeneration zone; where in the housing a drying agent is provided; and where the pressure line includes a heat-exchanger for cooling the compressed gas before it enters the drying zone. A tap-off pipe is connected to the discharge line that is connected to a cooling inlet of the heat-exchanger, while the heat-exchanger further includes a cooling outlet that is connected to the inlet of the
(Continued)

regeneration zone, while the outlet of the regeneration zone is connected to the pressure line.

13 Claims, 2 Drawing Sheets

(51) Int. Cl.
*F04B 39/06* (2006.01)
*F04B 39/16* (2006.01)

(52) U.S. Cl.
CPC ...... *B01D 53/265* (2013.01); *B01D 2253/104* (2013.01); *B01D 2253/106* (2013.01); *B01D 2253/108* (2013.01); *B01D 2257/80* (2013.01); *B01D 2258/06* (2013.01); *B01D 2259/40001* (2013.01); *B01D 2259/4009* (2013.01)

(58) Field of Classification Search
CPC ........ B01D 2253/106; B01D 2253/108; B01D 2257/80; B01D 2258/06; B01D 2259/40001; B01D 2259/4009; F04B 39/06; F04B 39/16; F24F 3/1423
USPC ..... 95/125–128, 143, 144; 96/113, 114, 148
See application file for complete search history.

(56) References Cited

U.S. PATENT DOCUMENTS

| | | | |
|---|---|---|---|
| 5,137,548 A * | 8/1992 | Grenier | F25J 3/04296 95/41 |
| 5,213,593 A * | 5/1993 | White, Jr. | B01D 53/0462 95/99 |
| 5,385,603 A | 1/1995 | Sienack | |
| 5,701,762 A | 12/1997 | Akamatsu | |
| 5,925,169 A | 7/1999 | Vertriest | |
| 6,221,130 B1 | 4/2001 | Kolodziej et al. | |
| 8,349,054 B2 | 1/2013 | Fredenhagen et al. | |
| 8,721,769 B2 | 5/2014 | Vermeer | |
| 10,576,411 B2 * | 3/2020 | Vertriest | B01D 53/261 |
| 2010/0031528 A1 | 2/2010 | Akkeman | |
| 2012/0118152 A1 | 5/2012 | Vermeer | |
| 2013/0000143 A1 | 1/2013 | Fux | |
| 2014/0260967 A1 | 9/2014 | Gitschlag | |

FOREIGN PATENT DOCUMENTS

| | | |
|---|---|---|
| JP | S6125623 A | 2/1986 |
| JP | H10028832 A | 2/1998 |
| JP | 2015178106 A | 10/2015 |
| WO | 01/87463 A1 | 11/2001 |
| WO | 02/38251 A1 | 5/2002 |
| WO | 2007/079553 A1 | 7/2007 |
| WO | 2011017785 A1 | 2/2011 |
| WO | 2011050423 A2 | 5/2011 |
| WO | 2012147153 A1 | 11/2012 |
| WO | 2015039193 A2 | 3/2015 |
| WO | 2016/094968 A1 | 6/2016 |

* cited by examiner

COMPRESSOR INSTALLATION WITH DRYING DEVICE FOR COMPRESSED GAS AND METHOD FOR DRYING COMPRESSED GAS

CROSS REFERENCE TO RELATED APPLICATIONS

This application is a continuation application of U.S. application Ser. No. 15/784,890, filed Oct. 16, 2017, which claims the benefit of Belgium application BE 2016/5804, filed Oct. 25, 2016, all of which are incorporated herein by reference.

BACKGROUND OF THE INVENTION

The present invention concerns a compressor installation with a drying device for compressed gas, with the compressor installation having a compressor element with an outlet for compressed gas to which a first end of a pressure line is connected; whereby said drying device has a housing with inside it a drying zone with a first inlet for compressed gas to be dried, to which a second end of said pressure line is connected in such a way that the full flow rate of compressed gas originating from said compressor element is transported to the drying zone; and whereby said drying zone further comprises a first outlet for dried, compressed gas to which a discharge line is connected; whereby in said housing a regeneration zone is also provided with a second inlet for the supply of a regeneration gas, and a second outlet for the discharge of used regeneration gas; whereby in the housing of the drying device a drying agent can be successively moved through said drying zone and the regeneration zone; and whereby said pressure line includes a heat-exchanger for cooling the compressed gas before it enters said drying zone.

A disadvantage of known compressor installations provided with a drying device is that a considerable cooling capacity is required to make the temperature of the gas to dry low enough to obtain efficient drying in the drum.

Dryers for compressed gas with a rotatable desiccant drum containing drying agent are already known and are for example described in WO 01/87463, WO 02/38251, WO 2007/079553, U.S. Pat. No. 5,385,603 and the U.S. Pat. No. 8,349,054.

SUMMARY OF THE INVENTION

The purpose of the present invention is to provide an improved and/or alternative compressor installation.

To this end the invention concerns a compressor installation with a drying device for compressed gas, with the compressor installation being equipped with a compressor element with an outlet for compressed gas to which a first end of a pressure line is connected; whereby said drying device is provided with a housing with inside it a drying zone with a first inlet for compressed gas to be dried, to which a second end of said pressure line is connected in such a way that the full flow rate of compressed gas originating from said compressor element is transported to the drying zone; and whereby said drying zone further comprises a first outlet for dried, compressed gas to which a discharge line is connected; whereby in said housing a regeneration zone is also provided with a second inlet for the supply of used regeneration gas, and a second outlet for the discharge of the regeneration gas; whereby in the housing of the drying device a drying agent can be successively moved through said drying zone and the regeneration zone; and whereby said pressure line comprises a heat-exchanger for cooling the compressed gas before it enters said drying zone; and whereby, according to the invention, a first tap-off pipe is connected to said discharge line that is connected to a cooling inlet of said heat-exchanger, while said heat-exchanger further comprises a cooling outlet that is connected by a second regeneration line to said second inlet of the regeneration zone, while the second outlet of the regeneration zone is connected by a return line to said pressure line, at a point downstream of said heat-exchanger.

An important advantage of a compressor installation according to the invention is that for the regeneration of the drying agent is made of a part of the already dried gas that to this end is branched off downstream of the drying zone, with this part of the gas also heated in an energy-saving way by making use of the compression heat, whereby the relative humidity of the regeneration gas becomes exceptionally low, while the compressor installation also works energy-efficiently by usefully using the discharged compression heat in the heat-exchanger. Indeed, in this way cooling capacity savings are made and no heating element has to be provided to obtain a sufficiently low relative humidity of the regeneration gas for a very good regeneration of the drying agent.

The present invention also concerns a method for drying compressed gas originating from a compressor element, whereby use is made of a drying device provided with a housing inside of which there is a drying zone through which the full flow rate of gas to be dried is transported; whereby in said housing also a regeneration zone is provided through which a regeneration gas is simultaneously transported; and whereby the compressed gas to be dried is cooled in a primary part of a heat-exchanger before entering said drying zone; and whereby, according to the invention, a part of the dried compressed gas is branched off at an outlet of the drying zone, and then guided through a secondary part of said heat-exchanger to be heated by means of the compression heat of the gas to be dried, before being guided to an inlet of the regeneration zone to serve as regeneration gas therein.

According to a special variant of the method according to the invention, the branched off dried gas is guided parallel through a secondary part of a number of heat-exchangers, whereby each of these heat-exchangers comprises a primary part that is connected to the outlet of one respective compressor element from a series of at least two compressor elements connected in series. The invention is not limited as such because all types of heat-exchangers can be used, for example also heat-exchangers not provided with a primary part that is connected to the outlet of a compressor element. Combinations of heat-exchangers are also possible, with one or more having a primary part connected to the outlet of a compressor element, while there are also heat-exchangers that do not have such a connection.

BRIEF DESCRIPTION OF THE DRAWINGS

With the intention of better showing the characteristics of the present invention, as an example, without any limiting nature, some preferred embodiments of a compressor installation according to the invention are described, as well as a method according to the invention for drying compressed gas, with reference to the accompanying drawings, wherein.

DETAILED DESCRIPTION OF THE INVENTION

Figure 1:
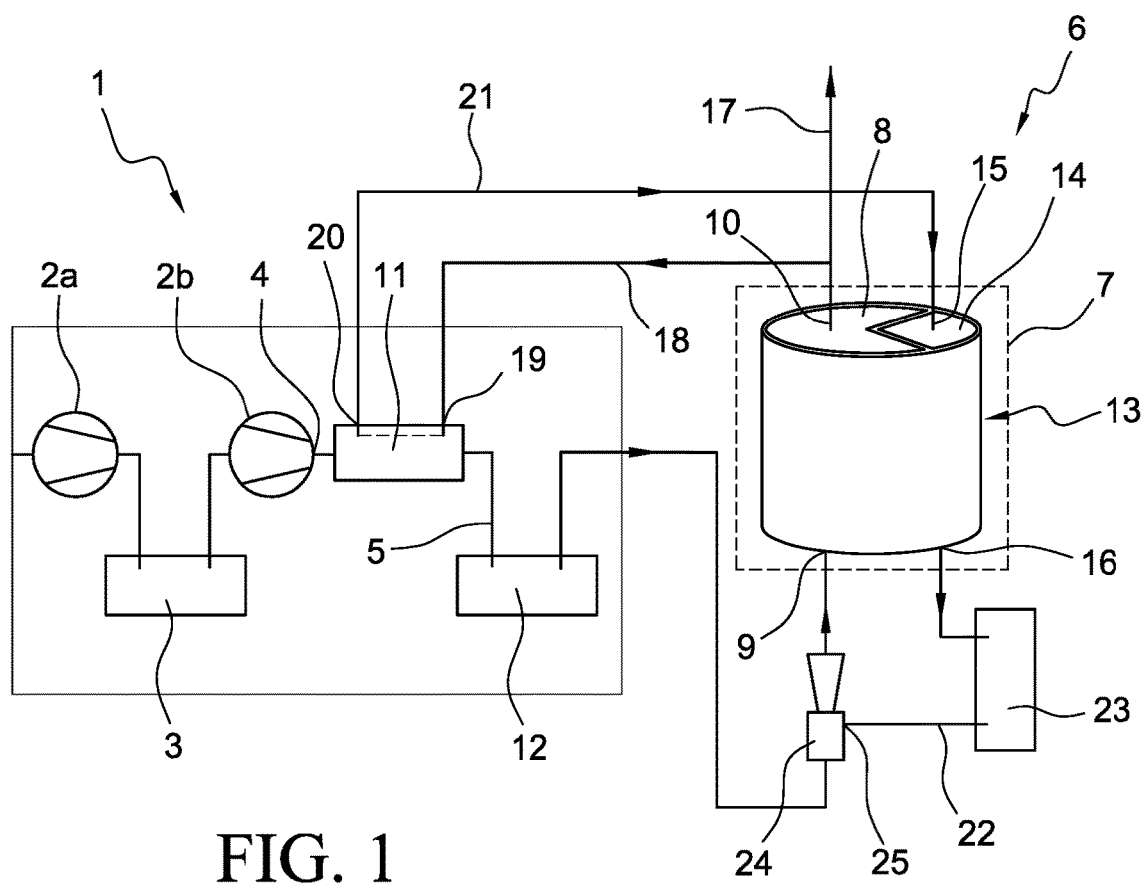
FIGS. 1 to 3 schematically show different embodiments of a compressor installation according to the invention.

FIG. 1 shows a first embodiment of a compressor installation 1 according to the invention that in this case comprises two compressor elements 2a and 2b. The invention is not limited as such, however a compressor installation 1 according to the invention can also comprise one or more than two compressor elements 2a and 2b.

The compressor elements 2a and 2b are connected to drive means not shown in the figure, for example in the form of one or more motors, turbines, sprocket wheels or suchlike.

In this case the compressor elements 2a and 2b form a first low pressure stage 2a and downstream thereof a second high pressure stage 2b. Preferably, an intercooler 3 is provided in the connection line between the relative compressor elements 2a and 2b.

The high pressure compressor element 2b is provided with an outlet 4 for compressed gas to which a first end of a pressure line 5 is connected.

The compressor installation 1 according to the invention further comprises a drying device 6 for compressed gas, with the drying device 6 comprising a housing 7 in which a drying zone 8 is located with a first inlet 9 for compressed gas to be dried and a first outlet 10 for dried, compressed gas, typically at the opposite end of said housing 7.

Said pressure line 5 is connected by its second end to said first inlet 9 for compressed gas to be dried.

Said pressure line 5 contains a heat-exchanger 11 for cooling compressed gas that flows from the high pressure compressor element 2b to the first inlet 9 of the drying zone 8. The configuration of the heat-exchanger 11 mentioned is such that cooling takes place before the compressed gas that originates from the high pressure compressor element 2b enters the drying zone 8.

In this case, but not necessarily, the pressure line 5 is also provided with an aftercooler 12, that is preferably fitted downstream of said heat-exchanger 11, meaning according to the flow direction of the compressed gas, between this heat-exchanger 11 and said first inlet 9 of the drying zone.

In said housing 7 of the drying device 6 a drum 13 can be fitted rotatably in the known way, with the drum 13 connected to drive means not shown in the figure for allowing this drum 13 to rotate in the housing 7, for example in the form of an electric motor. The relative drum 13 contains a regenerable drying agent or so-called desiccant material, such as grains of silica gel, activated alumina or molecular sieve material, or a combination thereof. Obviously, the drying agent can also be realised in other forms and/or not provided in the drum, e.g., the drying agent is provided in the housing.

Besides said drying zone 8, in the housing 7 of the drying device 6 there is also at least a regeneration zone 14.

The drum 13 is configured in the known way such that with rotation the drying agent can move successively through said drying zone 8 and the regeneration zone 14.

Said regeneration zone 14 is provided with a second inlet 15 for the supply of a regeneration gas and with an opposite second outlet 16 for the discharge of used regeneration gas. Used regeneration gas is understood to mean gas that, after passage through the regeneration zone 14, is contaminated with moisture extracted from the drying agent.

A discharge line 17 is connected to said first outlet 10 of the drying zone 8 to remove dried, compressed gas, to a user not shown in the figure, for example in the form of a compressed air network, a pressure vessel or a machine or equipment that uses compressed gas.

According to the invention, to said discharge line 17 a first tap-off pipe 18 is connected which is connected to a cooling inlet 19 of said heat-exchanger 11, while said heat-exchanger 11 further comprises a cooling outlet 20 connected through a second regeneration line 21 to said second inlet 15 of the regeneration zone 14.

The relative cooling inlet 19 and cooling outlet 20 in this case form part of a secondary part of the heat-exchanger 11, the primary part of which is configured such that the compressed gas to be dried is guided through it.

The second outlet 16 of the regeneration zone 14 is connected by a return line 22 to said pressure line 5, at a point downstream of said heat-exchanger 11, and in this case, on the part of the pressure line 5 that connects the aftercooler 12 to the first inlet 9 of the drying zone 8.

In this example the return line 22 also has an additional cooler 23 and possibly a condensate separator that may or may not be housed in the same housing as the cooling part of the cooler 23 and that is not visible in FIG. 1.

In the example in FIG. 1 the connection between the return line 22 and the pressure line 5 is realised by means of a venturi 24 that is fitted in the pressure line 5 and is provided with a suction opening 25 to which said return line 22 is connected.

The operation of a compressor installation 1 according to FIG. 1 is very simple and as follows.

The low pressure stage 2a sucks a gas or mixture of gases to be compressed such as air. Then a part of the compression heat generated is discharged by means of the intercooler 3.

After leaving the intercooler 3 the compressed gas flows to the high pressure stage 2b, where it is further compressed, and then to the primary part of the heat-exchanger 11. In the relative heat-exchanger 11, which at least partly functions as gas-gas heat-exchanger, compression heat is transferred to the gas that enters the heat-exchanger 11 through the cooling inlet 19 and leaves the heat-exchanger again through the cooling outlet 20.

It is clear that the heat-exchanger 11 is assembled such that the gas that flows through the pressure line 5 is not mixed with the gas that is guided as coolant gas through the secondary side of the heat-exchanger 11. In this case the heat-exchanger 11 is configured such that both gas flows flowing through it flow in opposite directions, however this is not strictly required according to the invention.

The pre-cooled, compressed gas that leaves the heat-exchanger 11 and flows further through the pressure line 5 then arrives in the aftercooler, where further cooling of this gas flow takes place.

Then the cold, compressed gas flows through the venturi 24 and the first inlet 9 through the drying zone 8, where the moisture present in the gas is absorbed by the drying agent that is present in the drying zone 8 at the time.

Cold, dry compressed gas then leaves the drying zone 8 through the first outlet 10 and flows through the discharge line 17 to the user of compressed gas.

According to the invention a part of the cold, dried, compressed gas is branched off from of the discharge line 17 and then directed through the first tap-off pipe 18, to the secondary part of the heat-exchanger 11 and more specifically to said cooling inlet 19 to serve there as cooling medium.

When the gas leaves the cooling outlet 20, its temperature is increased by absorption of the compression heat generated in the high pressure compressor element 2b. As a result, the relative humidity of the gas branched off through the tap-off pipe 18 will be further decreased in a highly energy efficient way.

The extra dry gas that flows through the regeneration line 21 is finally guided through the second inlet 15 to the regeneration zone 14, where this gas serves as regeneration gas that will extract moisture from the drying agent that is in the regeneration zone 14 at the time.

After the regeneration gas has left the regeneration zone 14 through the second outlet 16, it flows through the additional cooler 23 and the possible condensate separator downstream of it, that may but does not necessarily have to be integrated in the same housing as that of the cooler 23, to the suction opening 25 of the venturi 24.

According to the invention the presence of a venturi is not strictly necessary, however use can also be made of for example a blower for converging the regeneration gas that leaves the regeneration zone 14 with the flow of warm, compressed gas that flows from the heat-exchanger 11 to the drying zone 8 through the pressure line 5.

Figure 2:
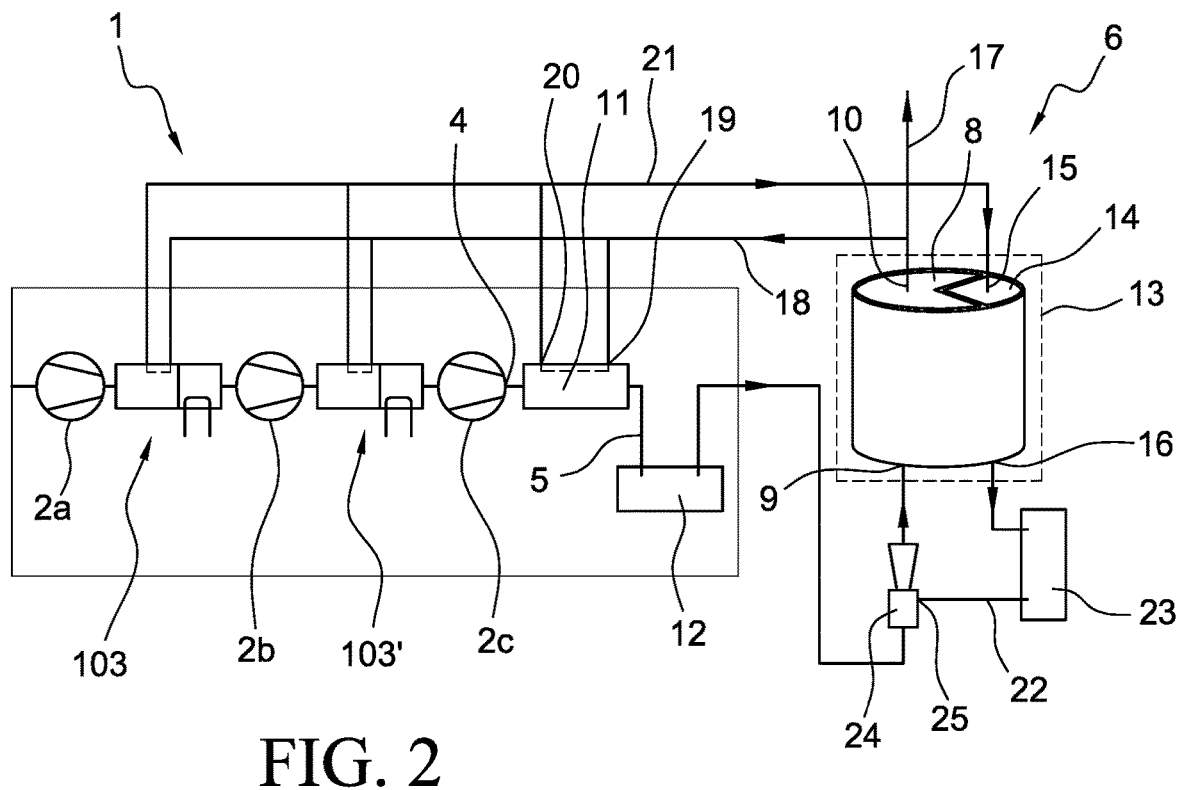

FIG. 2 shows a variant of a compressor installation 1 according to the invention in the form of a three-stage machine comprising compressor elements 2a, 2b and 2c fitted in series.

Between the first low pressure stage 2a and the second pressure stage 2b there is a first intercooler 103, while between the second pressure stage 2b and the third high pressure stage 2c there is a second intercooler 103'.

Downstream of the third high pressure stage 2c, as with the embodiment in FIG. 1, a heat-exchanger 11 is provided with an aftercooler 12 connected in series.

Figure 4:
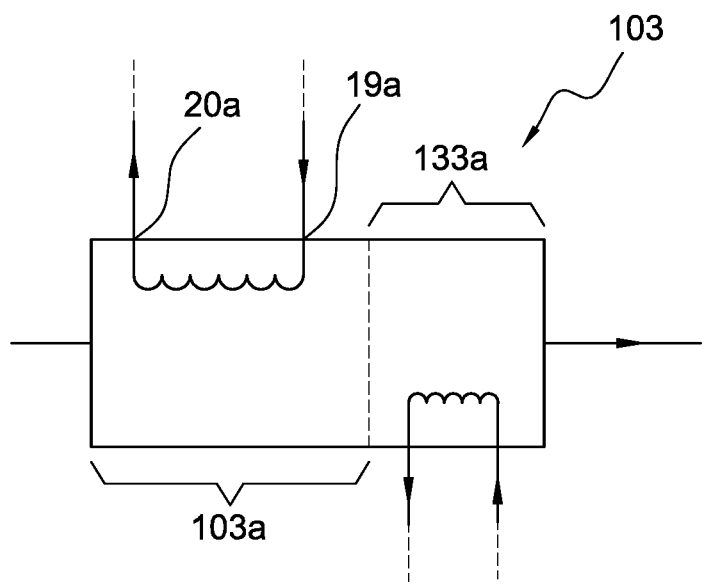
FIG. 4 schematically shows an intercooler from FIG. 2 on a larger scale.

As shown in more detail in FIG. 4, in this example the intercoolers 103 and 103' are realised in two parts, with a first recovery part 103a and a second cooling part 133a.

Each respective recovery part 103a has a primary and a secondary part, whereby the primary part comprises the flow channel for the compressed air to be dried that originates from the compressor element 2a or 2b located immediately upstream of the relative intercooler 103 or 103', while the secondary part comprises a cooling channel with a cooling inlet 19a and a cooling outlet 20a.

In this embodiment the first tap-off pipe 18 is not only connected to the cooling inlet 19 of the heat-exchanger 11, however also in parallel to the respective cooling inlets 19a of the intercoolers 103 and 103'.

Similarly, the cooling outlets 20a, together with cooling outlet 20 of the heat-exchanger 11 are connected to the second regeneration line 21.

The second cooling parts 133a of the intercoolers 103 and 103' also comprise a primary and a secondary part, whereby the primary part comprises the flow channel for the compressed air to be dried, while the secondary part comprises a cooling channel through which a cooling fluid can be guided, preferably, but not necessarily, as a counterflow to the gas flow of the compressed gas to be dried.

The cooling fluid can be a liquid such as water or oil, or a gas or mixture of gases such as air.

In this case the recovery parts 103a and the cooling parts 133a are fitted in a shared housing, however these can also be separated from each other and realised as separate components. Also according to the invention, not both intercoolers 103 and 103' have be connected to the tap-off pipe 18 or the regeneration line 21, however it is also possible that only one of these intercoolers 103 or 103' are connected to the relative lines 18 and 21.

With such a variant the second cooling part 133a of one or more intercoolers 103 and/or 103' can be omitted.

The working of the embodiment as shown in FIG. 2 is essentially similar to the working of the compressor installation 1 in FIG. 1, with the most important difference being that the compression heat from the lower pressure stages 2a and 2b can be utilised to further lower the relative humidity of the gas that is used for regeneration, because this regeneration gas will act as coolant in the recovery parts 103a of the intercoolers 103, 103' respectively and will absorb compression heat there.

The second cooling parts 133a can ensure that any excess compression heat still present in the compressed gas after passing the primary part can be discharged, such that better compression efficiency can be obtained in the following downstream compression stage.

The residual heat can for example be used for other purposes such as heating sanitary water.

Figure 3:
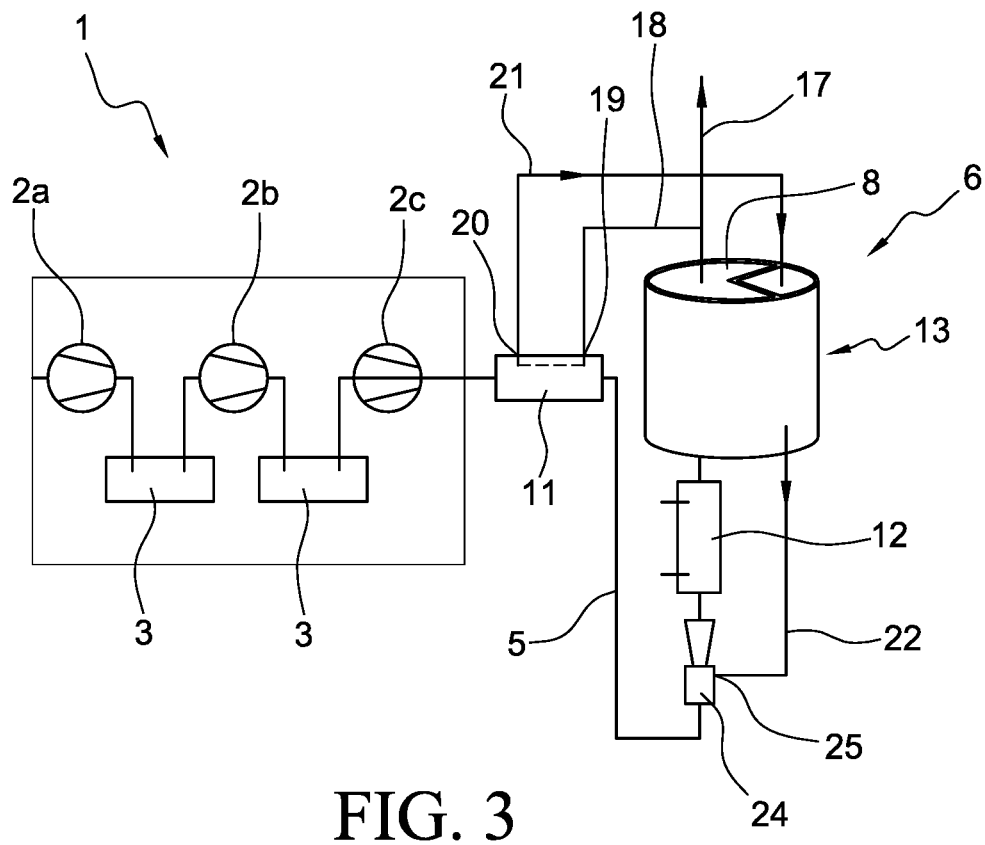

FIG. 3 shows another embodiment of a compressor installation 1 according to the invention, whereby in this case three compressor elements 2a, 2b and 2c, connected in series, are provided. In this embodiment the connection between the return line 22 and the pressure line 5 is provided in a place downstream of the heat-exchanger 11 and upstream of the aftercooler 12. In this way no additional cooler needs to be provided in the return line 22, so costs can be saved.

Although not displayed in the figures, in the housing 7 of the drying device 6 a cooling zone can also be provided, besides said drying zone 8 and the regeneration zone 14.

In such a case, in the known way a part of the dried gas at the first outlet 10 of the drying zone 8 can be diverted to flow through this cooling zone and then cool the drying agent that is present in said cooling zone at the time.

The present invention is by no means limited to the embodiments described as examples and shown in the drawings but, a compressor installation according to the invention with a drying device for drying compressed gas can be realized in all kinds of variants, without departing from the scope of the invention. Similarly, the method according to the invention for drying compressed gas, is not limited to the variant described above, but can be realized in all kinds of variants, without departing from the scope of the invention.

The invention claimed is:

1. A compressor installation with a drying device for compressed gas, with the compressor installation comprising a compressor element with an outlet for compressed gas to which a first end of a pressure line is connected; whereby said drying device is provided with a housing with inside it a drying zone with a first inlet for compressed gas to be dried, to which a second end of said pressure line is connected in such a way that the full flow rate of compressed gas originating from said compressor element is transported to the drying zone; and whereby said drying zone further comprises a first outlet for dried, compressed gas to which a discharge line is connected; whereby in said housing a regeneration zone is also provided, with a second inlet for the supply of a regeneration gas, and a second outlet for the discharge of the regeneration gas; whereby in the housing of the drying device a drying agent is provided and whereby said pressure line comprises a heat-exchanger for cooling the compressed gas before it enters said drying zone, wherein on said discharge line a first tap-off pipe is connected that is connected to a cooling inlet of said heat-exchanger, while said heat-exchanger further comprises a cooling outlet that is connected through a second regeneration line to said second inlet of the regeneration zone, while the second outlet of the regeneration zone is connected through a return line to said pressure line, at a point downstream of said heat-exchanger.

2. The compressor installation according to claim 1, wherein said heat-exchanger in the pressure line is provided in a place downstream of said compressor element and upstream of an aftercooler that is also provided in said pressure line.

3. The compressor installation according to claim 2, wherein no cooler is provided in said return line.

4. The compressor installation according claim 1, wherein said return line connects to a suction opening of a venturi fitted in the pressure line.

5. The compressor installation according to claim 1, wherein in said return line a blower is provided for the convergence of the used regeneration gas with the gas to dry in the pressure line.

6. The compressor installation according to claim 4, wherein said heat-exchanger is provided upstream of said venturi.

7. The compressor installation according to claim 2, wherein said aftercooler is provided downstream of the venturi and upstream of the inlet of the drying zone.

8. The compressor installation according to claim 2, wherein said aftercooler is provided upstream of the venturi and downstream of the heat-exchanger.

9. The compressor installation according to claim 1, wherein said heat-exchanger is made up of two parts, with a first recovery part and a second cooling part.

10. The compressor installation according to claim 9, wherein said heat-exchanger is an intercooler, that is fitted according to the flow of the compressed gas to be dried, between two compressor elements connected in series.

11. A method for drying compressed gas originating from a compressor element, said method comprising using a drying device provided with a housing within which a drying zone is located through which the full flow rate of gas to be dried is transported; whereby in said housing also a regeneration zone is provided through which a regeneration gas is simultaneously transported; and whereby the compressed gas to be dried is cooled in a primary part of a heat-exchanger before entering said drying zone; wherein a part of the dried compressed gas is branched off at an outlet of the drying zone, and then guided through a secondary part of said heat-exchanger to be heated before being guided to an inlet of the regeneration zone to serve as regeneration gas therein, wherein the branched off dried gas is guided parallel through a secondary part of a number of heat-exchangers, whereby each of these heat-exchangers comprises a primary part that is connected to the outlet of one compressor element from a series of at least two compressor elements connected in series.

12. A method for drying compressed gas originating from a compressor element, said method comprising using a drying device provided with a housing within which a drying zone is located through which the full flow rate of gas to be dried is transported; whereby in said housing also a regeneration zone is provided through which a regeneration gas is simultaneously transported; and whereby the compressed gas to be dried is cooled in a primary part of a heat-exchanger before entering said drying zone; wherein a part of the dried compressed gas is branched off at an outlet of the drying zone, and then guided through a secondary part of said heat-exchanger to be heated before being guided to an inlet of the regeneration zone to serve as regeneration gas therein, wherein the branched off part of dry gas is guided through the secondary part of a recovery part of a two-part heat-exchanger that also comprises a cooling part.

13. The method according to claim 12, wherein a separate cooling flow is guided through a secondary part of said cooling part.

* * * * *